United States Patent [19]

Singhal et al.

[11] Patent Number: 5,313,224
[45] Date of Patent: May 17, 1994

[54] APPARATUS FOR SHADE GRADATION ENHANCEMENT AND FLICKER REDUCTION IN MULTISHADE DISPLAYS

[75] Inventors: Dave M. Singhal, San Jose; Chester F. Bassetti, Jr., Pleasanton; Bryan Richter; Jihad Y. Abudayyeh, both of Fremont, all of Calif.

[73] Assignee: Cirrus Logic, Inc., Fremont, Calif.

[21] Appl. No.: 865,091

[22] Filed: Apr. 8, 1992

Related U.S. Application Data

[63] Continuation-in-part of Ser. No. 335,622, Apr. 10, 1989, Pat. No. 5,185,602.

[51] Int. Cl.$^5$ ............................................. G09G 3/36
[52] U.S. Cl. ...................................... 345/89; 345/99; 345/148
[58] Field of Search ............... 340/793, 767, 701, 703; 345/89, 99, 148

[56] References Cited

U.S. PATENT DOCUMENTS 5,068,649 11/1991 Garrett ........................... 340/793

OTHER PUBLICATIONS

"Technical Reference LQ10D01", Sharp Corporation, Electronic Components Group, dated Mar. 1, 1990.
"Technical Literature for TFT-LCD module", Model No. LQ9D011, Sharp Corporation, Liquid Crystal Display Group, TFT LCD Development Center, Revised Dec. 13, 1991.
Copy of slides presented by Sharp Corporation at a Jun., 1993 seminar.

Primary Examiner—Jeffery Brier
Attorney, Agent, or Firm—Limbach & Limbach

[57] ABSTRACT

A method and apparatus for increasing the perceived gradation of the shades in visual displays is disclosed. A plurality of signals control the intensity of a sub-pixel of a display so that display can exhibit a native number of shades. Frame rate modulation techniques are used to increase the perceived gradation. Finally, flicker is reduced by spreading the phases of the modulating pixels across time, and the horizontal and vertical axes of the display.

7 Claims, 10 Drawing Sheets

|   | 0 | 1 | 2 |
|---|---|---|---|
| 0 | FRAME #  INTSY.<br>1  5<br>2  4<br>3  4<br>4  5<br>5  4<br>6  4 | FRAME #  INTSY.<br>1  4<br>2  5<br>3  4<br>4  4<br>5  5<br>6  4 | FRAME #  INTSY.<br>1  4<br>2  4<br>3  5<br>4  4<br>5  4<br>6  5 ••• |
| 1 | FRAME #  INTSY.<br>1  4<br>2  4<br>3  5<br>4  4<br>5  4<br>6  5 | FRAME #  INTSY.<br>1  5<br>2  4<br>3  4<br>4  5<br>5  4<br>6  4 | FRAME #  INTSY.<br>1  4<br>2  5<br>3  4<br>4  4<br>5  5<br>6  4 |
| 2 | FRAME #  INTSY.<br>1  4<br>2  5<br>3  4<br>4  4<br>5  5<br>6  4 | FRAME #  INTSY.<br>1  4<br>2  4<br>3  5<br>4  4<br>5  4<br>6  5 | FRAME #  INTSY.<br>1  5<br>2  4<br>3  4<br>4  5<br>5  4<br>6  4 |

APPARATUS FOR SHADE GRADATION ENHANCEMENT AND FLICKER REDUCTION IN MULTISHADE DISPLAYS

This is a continuation-in-part of co-pending U.S. application Ser. No. 07/335,622, filed Apr. 10, 1989, now U.S. Pat. No. 5,185,602.

TECHNICAL FIELD

The present invention relates generally to displays for digital computer systems, particularly to controlling raster displays which have a pixel persistence on the order of multiple display refresh times. More particularly, the invention relates to minimizing flicker on active matrix liquid crystal displays (LCD), and other such displays.

BACKGROUND ART

On a computer system display ergonomic principals often dictate that there be more gradations of displayable colors or intensities than what was originally provided for by the designers of the display panel component. Ergonomics also calls for less flicker from the display.

In some displays, producing more colors generates more flicker. The flicker in question occurs when a display controller utilizes certain techniques to increase the number of shades of intensity which a pixel on a LCD may display beyond the native shades originally provided for in the display. For example, a frame rate cycling ("FRC") technique has been employed with multishade displays which varies pel intensities over a sequence of frames in order to achieve a display having an intensity which is the average of the intensities being driven. In general, however, this technique produces flicker which must be minimized in order to provide an ergonomic display suitable for human interface.

Pixels on current raster color displays are composed of triplets of monochrome sub-pixels of primary or secondary colors. See display 101 in FIG. 1. See display 101, in FIG. 1A where, for each pixel location, only one out of three "sub-pixels" is shown, it being understood that in an actual color display three "subpixels" may be provided for each pixel. Each of these "sub-pixels" will be referred to herein as "pels", for example pel 102, FIG. 1A. Pels are the fundamental components of colors in a display. For purposes of the present application, the discussion will be in terms of pels so that a color panel can be viewed as a monochrome panel from the electrical standpoint.

U.S. Pat. No. 4,921,334, to Akodes, discloses a technique of frame rate cycling, herein referred to as Akodes' frame rate cycling approach, which increases the number of available shades from the native set of shades. When Akodes' approach is used, a pel's intrinsic shade capability may be nearly doubled. In accordance with Akodes' frame rate cycling approach, a pel is alternately driven with two intensities, across multiple frame refreshes, to produce a visual effect of the average (inter-shade) intensity. For example, in FIG. 1A, pel 102 is shown being driven with intensity levels 5 and 6 for an average intensity level of 5.5. This nearly doubles the number of available shades (less one due to the Nth intrinsic shade not having an N+1 shade with which to undergo FRC on a display with N intrinsic shades).

Figure 1A:
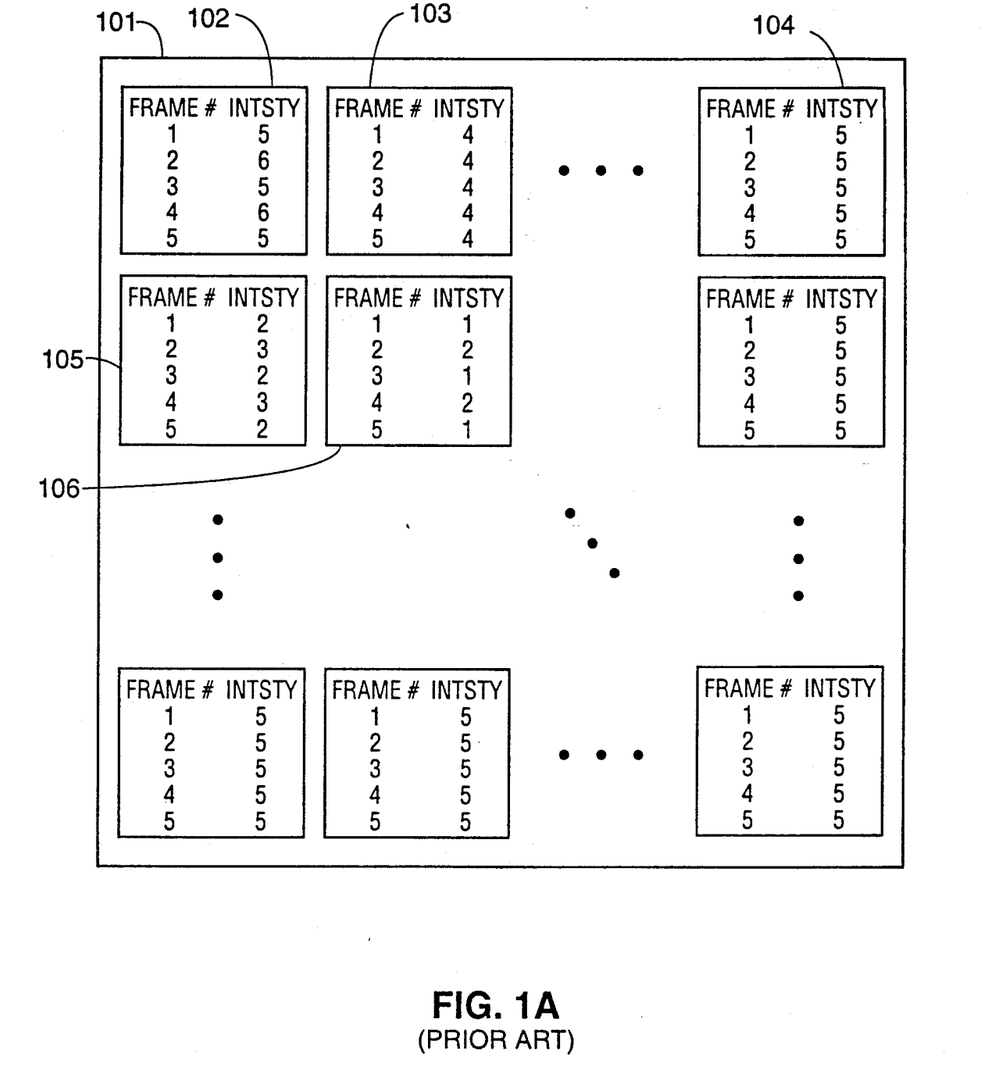
FIGS. 1A and 1B illustrate a display made up of pels, driven with specified intensities over successive frame refreshes, some of which are undergoing FRC in-phase with each other.
Figure 1B:
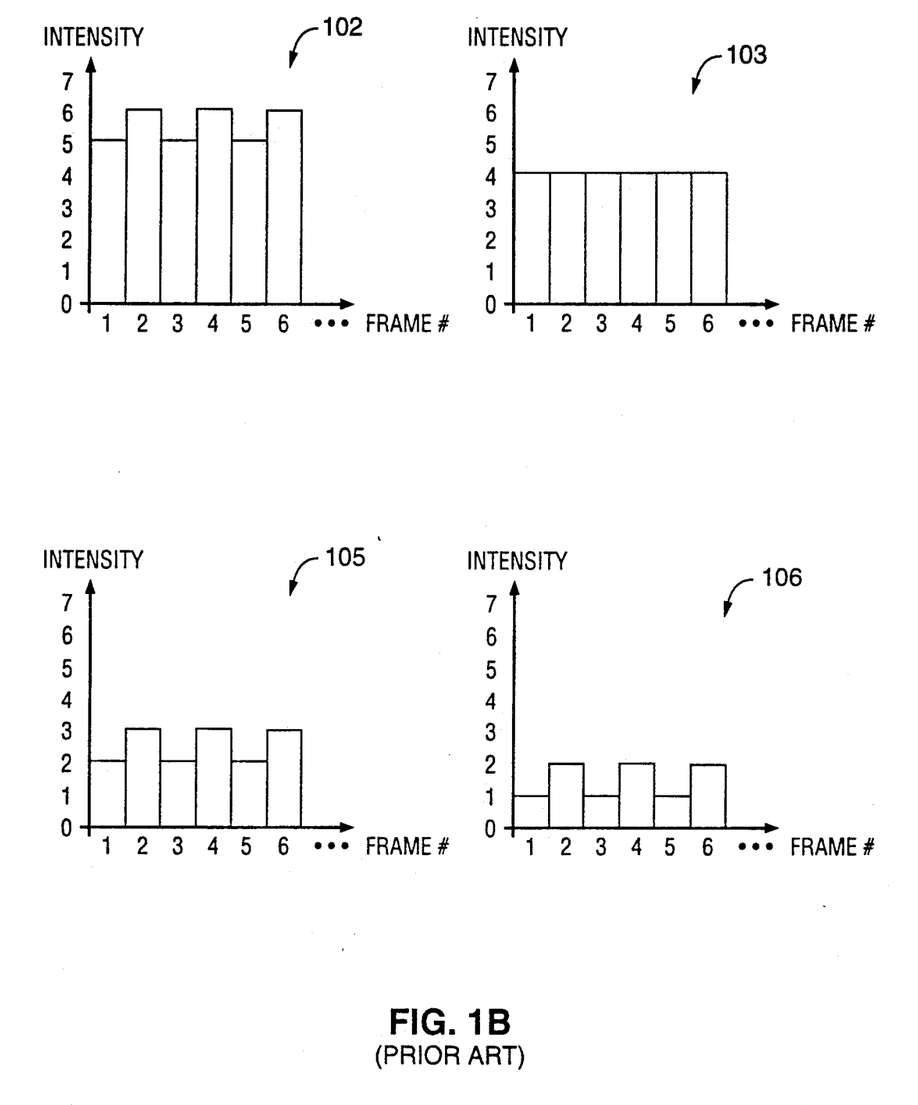

FIGS. 1A and 1B, illustrate Akodes' frame rate cycling approach, in which a FRC circuit alternately drives each pel undergoing FRC with a native intensity and an increased intensity from frame to frame. Pels 105 and 106, which are undergoing FRC, achieve average intensities over the sequence of frame refresh times of 2.5 and 1.5 respectively. However, as can be seen in FIGS. 1A and 1B, pels 105 and 106 cycle with their increased intensities in-phase with each other. Thus, from frame 1 to frame 2 both pels 105 and 106 are driven from a lower intensity to a higher intensity, i.e. in-phase with each other. The visual effect is that the increased intensities reinforce each other, accentuating flicker.

Another drawback with Akodes' frame rate cycling approach is that the number of shades produced is only about twice the number of native shades.

The in-phase FRC may be tolerable on displays in which there is a sufficient persistence on the pels so that the observer does not perceive a cycling of the intensities of the aggregate of FRC pels across the display. However, with some more recent display panels, persistence time has been reduced to yield faster response times. The use of Akodes' frame rate cycling approach on these displays is less desirable because the observer will perceive accentuated flicker. Because human perception is sensitive to aggregate features in displays, the observer perceives that the display's intensities are cycling.

Passive matrix liquid crystal displays differ from active matrix displays in that passive displays have longer persistence and generally have only a single bit per pel to control the intensity of the pel. In co-pending U.S. application Ser. No. 07/335,622, filed Apr. 10, 1989, now U.S. Pat. No. 5,185,602 entitled "Method and Apparatus for Producing Perception of High Quality Grayscale Shading on Digitally Commanded Displays" (hereinafter "the '622 Application"), and assigned to the same assignee as the subject application, there is discussed the reduction of perceivable flicker on an aggregate of pels in a passive display which are undergoing frame rate cycling by spreading the phases of the frame rate cycling in a specific pattern across the display.

One drawback of the system discussed in the '622 Application is that it does not support displays that have more than one bit per pel.

U.S. Pat. No. 4,769,713, issued Sep. 6, 1988, to Yasui, discusses the use of n-1 frames to generate n shades using frame rate cycling on panels which use a single command bit per pel. However, the disclosed circuit also does not support displays that have more than one command signal input per pel.

BRIEF SUMMARY OF THE INVENTION

In accordance with the present invention, in order to mitigate perceivable flicker in multishade displays, the frame rate cycling phases are spread out in a pattern across the pels undergoing FRC so as to minimize from one frame to the next the number of neighboring pels which undergo transitions in intensity which are in the same direction. It is to be understood that the term "multishade display" as used hereinafter in this application means displays which provide more than two native shades per pel thereby having more than one bit per pel, and including active matrix displays having more than two native shades per pel.

The invention reduces perceptible flicker on active matrix displays undergoing FRC by distributing the phase relationship among the pels undergoing FRC with respect to the spatial and temporal positions of the pels. This approach, herein termed "intermodulation"

(IM), enumeratively separates, by phase shifting, all possible phases of the FRC modulation waveforms being applied to the pels, thereby creating multiple phases of the waveforms. The multiple phases of the waveforms are then employed in a manner which distributes them across the pels along the X axis of the display in such a way as to minimize the in-phase relationship of the waveforms used on neighboring pels. Further, the multiple phases of the waveforms are distributed across the Y axis in such a way as to minimize the in-phase relationship of the waveforms used on neighboring pels.

Minimizing the in-phase relationship of neighboring pels reduces the mutual reinforcement of the phase cycling that in-phase cycling of neighboring pels produces. This enhances the out-of-phase relationship of neighboring pels undergoing FRC, which may cause the increased intensity on a given pel to offset the decreased intensity of a neighboring pel. Minimizing the mutual cycling reinforcement of neighboring pels and maximizing their out-of-phase relationship reduces flicker on pels undergoing FRC.

In accordance with the present invention, an apparatus and method are provided for use in a display system having an multishade display panel in which a plurality of pels arranged as dots within a plurality of lines, so that each pel is identifiable by a line number and a dot number, and wherein each pel produces one of N different native shades when it is driven with an associated one of N different drive levels during each frame in a sequence of consecutive frames.

Means are provided for driving a subject pel during the sequence of consecutive frames in a selected phase-pattern and frame rate duty cycle to produce a first native shade in one or more of the frames and to produce a second native shade, different from the first native shade, in the other frames. In this manner, the subject pel has an apparent or effective shade over the sequence of consecutive frames which is intermediate the first and second native shades, and the apparent or effective shade is determined by the selected frame rate duty cycle which specifies the number of frames in the sequence of consecutive frames in which the subject pel is driven to produce the first native shade and the number of frames in which the subject pel is driven to produce the second native shade. Further, the selection of the particular frames in which the first native shade is produced and of the frames in which the second native shade is produced is determined by the selected phase-pattern.

Means are also provided which are responsive to the dot number, the line number and the frame number, related to some arbitrary 0th frame, for the subject pel for selecting a phase-pattern for driving the subject pel and selecting phase-patterns for driving neighboring pels. These phase-patterns are selected so as to minimize, from frame to frame, the number of neighboring pels in which the transition between native shades is in the same direction as the direction of the transition between native shades in the subject pel.

Thus, in accordance with the present invention, for displays in which more than one bit (i.e. M bits per pel, encoded to produce $2^M$ native shades) per pel is used to control the intensity of the pel, the intensities are modulated on a pel over a number of frames, so that the average of the frame-time sequence of intensities produce the apparent intensity of the pel, while the in-phase flicker reinforcement of neighboring pels is reduced. Frame rate cycling is applied over two or more frame-times, P, to generate an apparent shade gradation factor increase of P, to produce a total of $2^M*P-(P-1)$ shades. On such a display system, the invention reduces perceptible flicker on pels undergoing frame rate cycling by distributing the phase relationship among such pels with respect to the spatial and temporal positions of the pels.

It is therefore an object of the present invention to provide in a display system equipped with more than one bit per pel supporting $2^M$ native shades, an apparatus and method for generating $2^M*P-(P-1)$ apparent shades by cycling modulation waveforms of the $M$ shades across P frametimes where the phase relationship of the applied modulating waveforms is distributed to reduce in-phase flicker reinforcement by modulating waveforms applied to neighboring pels.

A further object of the present invention is to provide a display system in which the phases of the modulation waveforms applied to the FRC pels are separated by phase shifting, thus creating multiple phases of the waveforms.

Another object of the present invention is to provide a display system in which the different phase-modulation waveforms of pels undergoing FRC are spread across the X axis in such a way as to minimize the in-phase intensity-change relationship of neighboring pels.

Still another object of the present invention is to provide a display system in which the different phase-modulation waveforms of pels undergoing FRC are spread across the Y axis in such a way as to minimize the in-phase intensity-change relationship of neighboring pels.

A still further object of the present invention is to minimize the mutual cycling reinforcement of neighboring pels and maximize their out-of-phase relationship in order to reduce flicker on pels under going FRC.

Another object of the invention is to spread modulation phases over an X or Y range that is a subset of the display X or Y size in order to minimize flicker for each subset region.

It is a further object of the present invention to reduce the observable flicker on displays undergoing FRC by staggering the phases of those pels which are in the proximity of one another.

Still other objectives, features and advantages of the present invention will become apparent as the invention is described below.

DETAILED DESCRIPTION OF THE PREFERRED EMBODIMENT

Figure 3A:
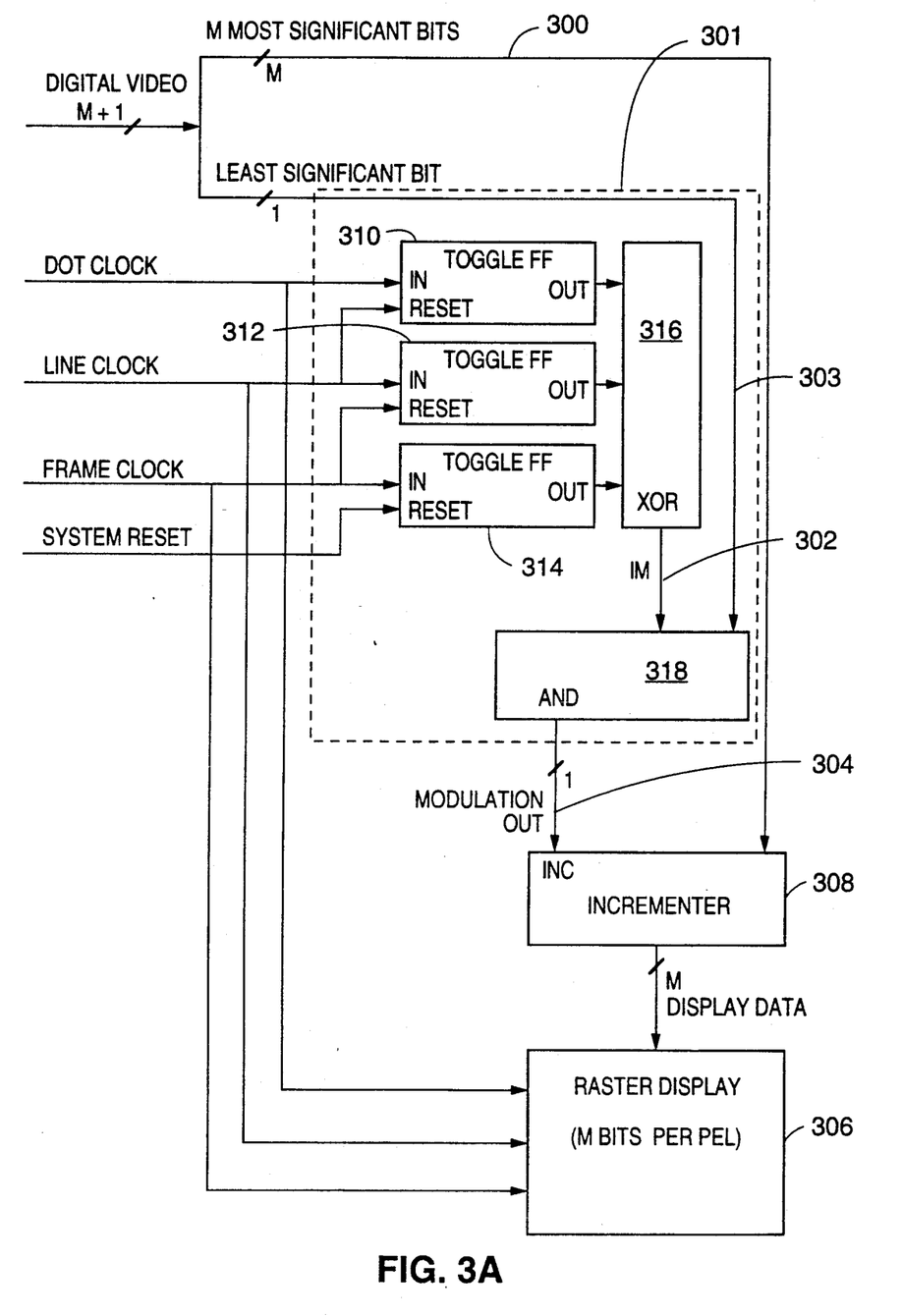
FIG. 3A provides one example of a simple circuit in accordance with the present invention that distributes FRC phases over the region of the whole display.
Figure 3B:
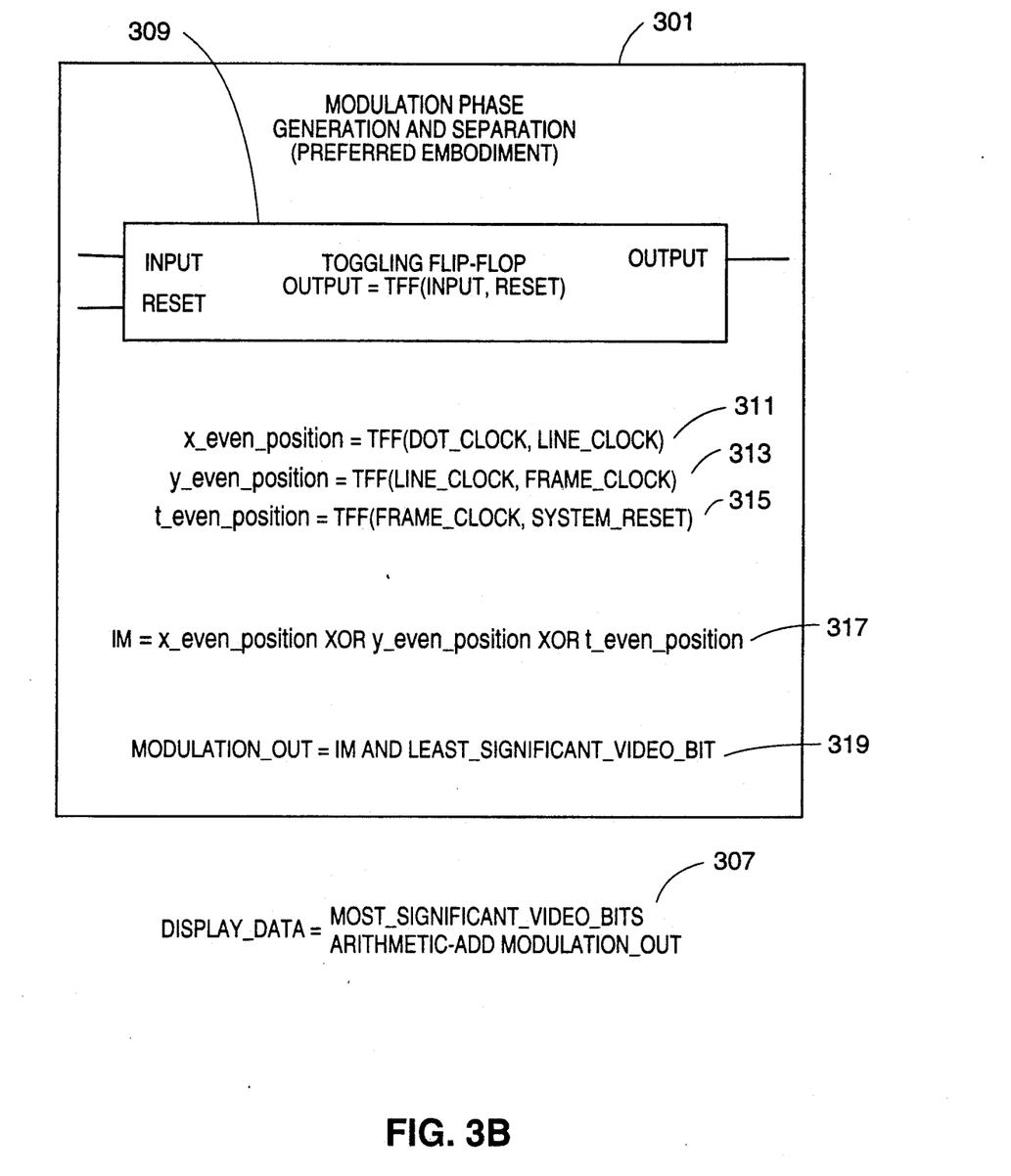
FIG. 3B illustrates an equivalent logical representation of block 301 in FIG. 3A.

Referring to FIGS. 3A and 3B, a simple example illustrating one embodiment of the present invention will now be discussed. FIG. 3A is functionally similar in some respects to that shown in FIG. 2 of U.S Pat. No. 4,921,334 to Akodes. However, circuit 301 has been added which controls the phasing of the intensity changes from frame to frame for neighboring pels. FIG. 3A provides an example of a circuit that generates a 2×2×2 matrix of even and odd dots, lines, and frames in which a 50% duty cycle modulation waveform is employed with the native shades to provide intermediate shades.

FIG. 3B illustrates the functional features of circuit 301 and the logical relationship between the output "modulation out" and the inputs: "dot clock", "line clock", "frame clock", "system reset", and "digital video LSB" (or "least significant video bit"). In FIG. 3B, "XOR" refers to an XOR logic gate, "AND" refers to an AND logic gate, and "ARITHMETIC ADD" refers to an arithmetic addition of adjoining named signals.

The signal "digital video" has M+1 bits, with the M most significant bits, on line 300, designating the native shade to be displayed on the current pel being driven in raster display 306. See FIG. 3A. The least significant bit of the digital video signal indicates whether or not the current pel is subject to frame rate cycling.

Figure 5:
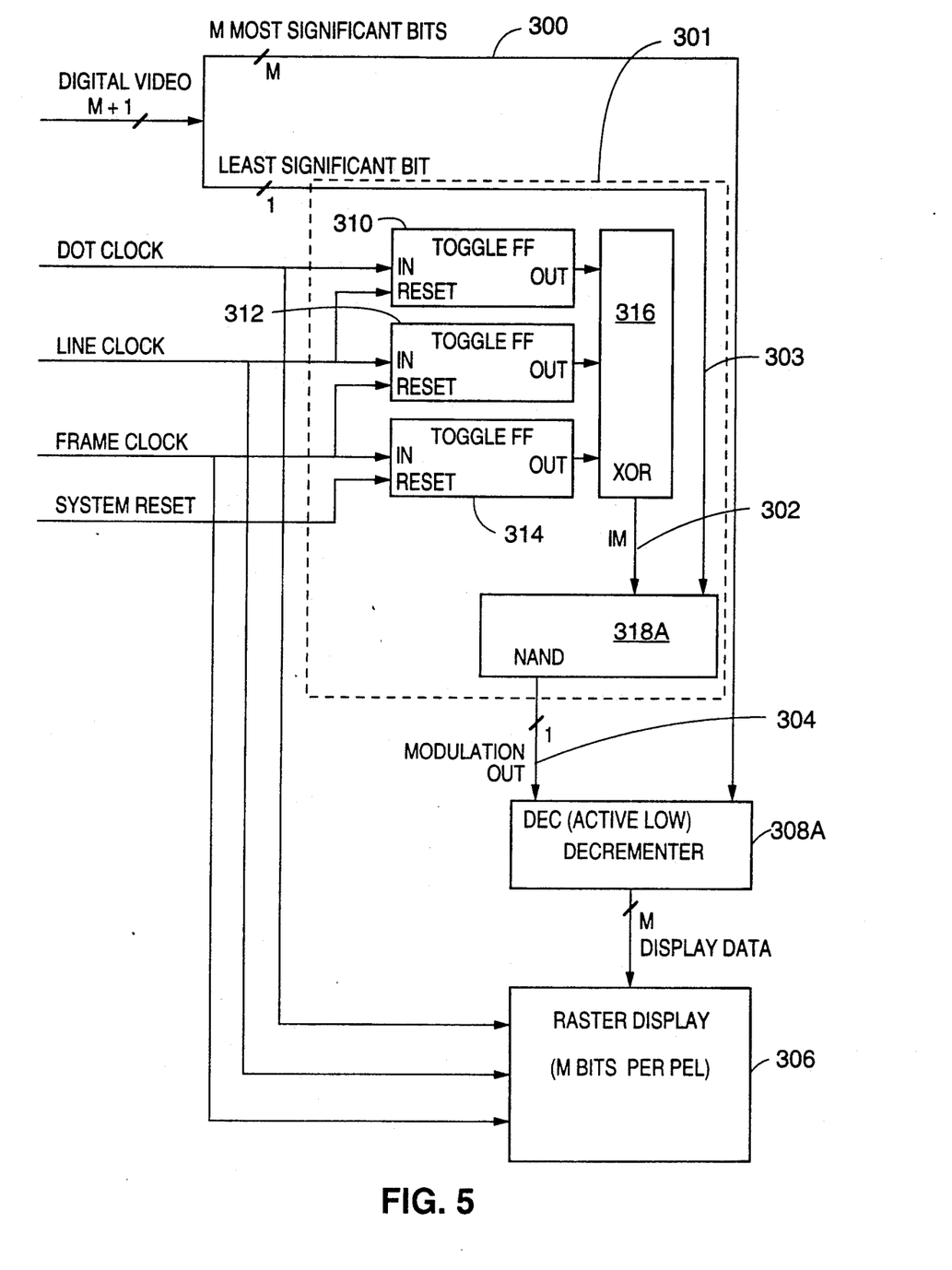
FIG. 5 illustrates an embodiment of the apparatus of FIG. 3A in which a decrementer is used in place of the incrementer.

As can be seen from FIGS. 3A and 3B, incrementer 308 increases the value of the M most significant bits on line 300 by one unit when the modulation out signal from modulation phase generation and separation circuit 301 is a logic one. As indicated by the logic statement 307, FIG. 3B, incrementer 308 is an arithmetic incrementer. In another embodiment of the present invention, the incrementer can be replaced with a decrementer 308A which is controlled by an active low "modulation out" command see FIG. 5.

The output of incrementer 308, "display data," which is the native shade increased by one unit, is then supplied to raster display 306 to drive the current pel.

Referring now more specifically to modulation phase generation and separation circuitry 301, it can be seen that three toggle flip-flop blocks are used. In FIG. 3B, block 309 illustrates the symbol used for the toggle flip-flop.

Modulation phase generation and separation circuit 301 separates the possible phases across frame refreshes (time, t) and spreads them across horizontal position (x) and vertical position (y). Toggle flip-flops 310, 312, and 314, FIG. 3A, toggle state each time a new x, y, or t event, respectively, occurs. The modulation phase generation and separation circuit 301 receives a pulse for each new move in position in the x (dot clock), y (line clock), or t (frame clock) domain, and toggles its output for each pulse. System_reset is the global pulse signal that the global system reset has been activated. System reset could also be left always inactive, allowing the power-on state of the frame 301 circuit to be arbitrary.

Referring to FIG. 3A, toggle flip-flop 310 is reset by the line clock and toggled by the dot clock. Thus, beginning with a logic zero with each new line of the raster display 306, toggle flip-flop 310 provides a logic one output for "even" dot positions and a logic zero for "odd" dot positions. FIG. 3B, logic statement 311, indicates the logical function of toggle flip-flop 310, namely to indicate when the pel is in an even "x", or dot, position.

Toggle flip-flop 312 is reset by the frame clock and toggled by the line clock, so that it provides a logic zero output on "odd" lines and a logic one output on "even" lines. In FIG. 3B, logic statement 313, it can be seen that the logical function of toggle flip-flop 312 is to detect an even "y", or line, position.

Toggle flip-flop 314, on the other hand, is reset by the system reset, and toggled by the frame clock, so that is provides a logic zero output on "odd" frames and a logic one output on "even" frames. In FIG. 3B, logic statement 315, toggle flip-flop 314 is indicated as detecting an even "t", or time, position starting from system reset, or other such global signal suitable for arbitrary frame count reset, including an always inactive signal.

Remaining with FIG. 3A, the outputs of toggle flip-flops 310, 312 and 314 are applied to three-input exclusive-OR gate 316. See logic statement 317, FIG. 3B. The output 302 of exclusive-OR gate 316 provides a signal that has 1) on any fixed x,y position, separated every other frame time (t); 2) on any fixed y,t position, separated every other horizontal pel position (x); and 3) on any fixed x,t position (y), separated every other vertical pel position (y). The truth table for exclusive-OR gate 316 is provided in Table A below:

TABLE A

| X EVEN POS. | Y EVEN POS. | T EVEN POS. | OUTPUT |
|---|---|---|---|
| 0 | 0 | 0 | 0 |
| 0 | 0 | 1 | 1 |
| 0 | 1 | 0 | 1 |
| 0 | 1 | 1 | 0 |
| 1 | 0 | 0 | 1 |
| 1 | 0 | 1 | 0 |
| 1 | 1 | 0 | 0 |
| 1 | 1 | 1 | 1 |

Finally, the output 304 of modulation phase generation and separation circuit 301 is the logical AND 318 of the output 302 of exclusive-OR gate 316 and the least significant bit on line 303 of the digital video signal. See logic statement 319, FIG. 3B.

Thus, modulation phase generation and separation circuit 301, for some arbitrarily numbered frame number, increments the pel's intensity by one intensity step during "even" numbered frames if, relative to some arbitrarily selected 0,0 numbered pel location, the pel in question is located on "even" numbered x and "even" numbered y positions, or "odd" numbered x and "odd" numbered y positions, or increments the pel's intensity by one intensity step during "odd" numbered frames if, relative to the same arbitrarily selected 0,0 numbered pel location, the pel in question is located on "even" numbered x and "odd" numbered y positions, or "odd" numbered x and "even" numbered y positions.

Figure 2A:
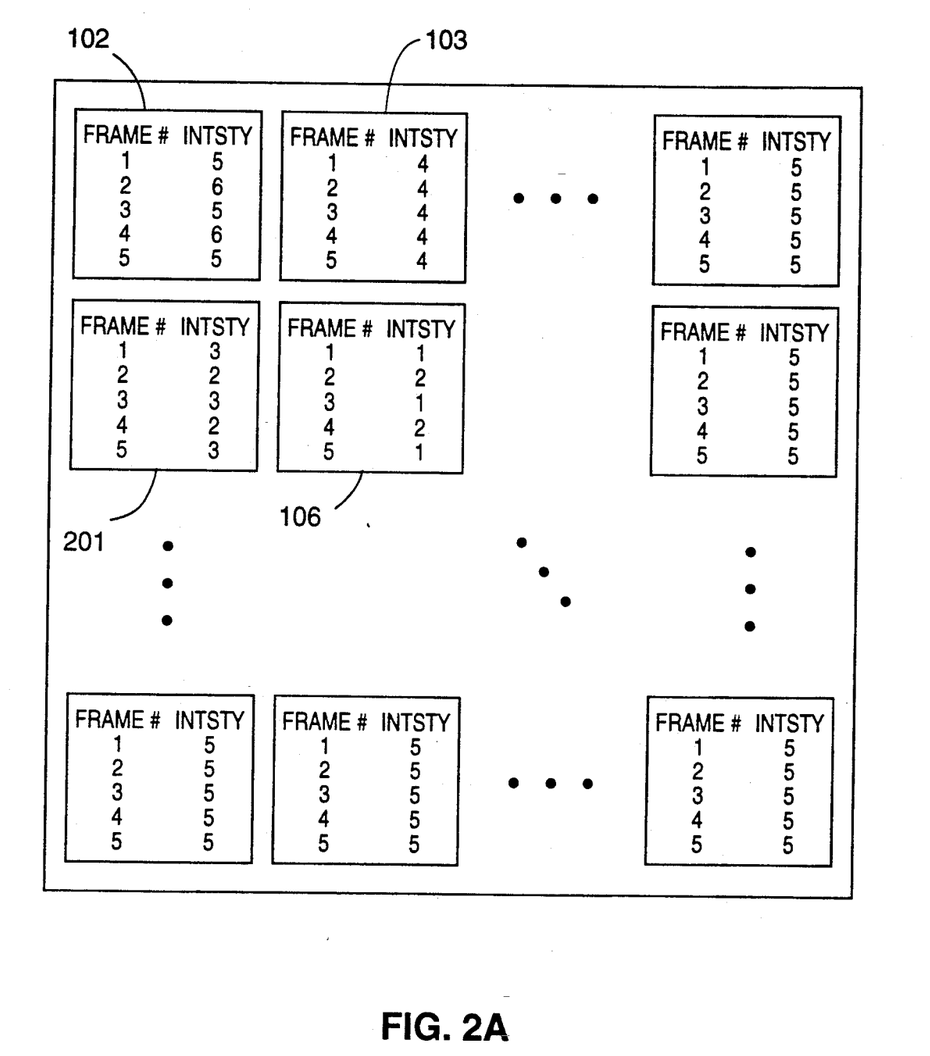
FIGS. 2A and 2B illustrate the display of FIG. 1A, but with separate FRC phases defined and with the phases separated in X and Y space.
Figure 2B:
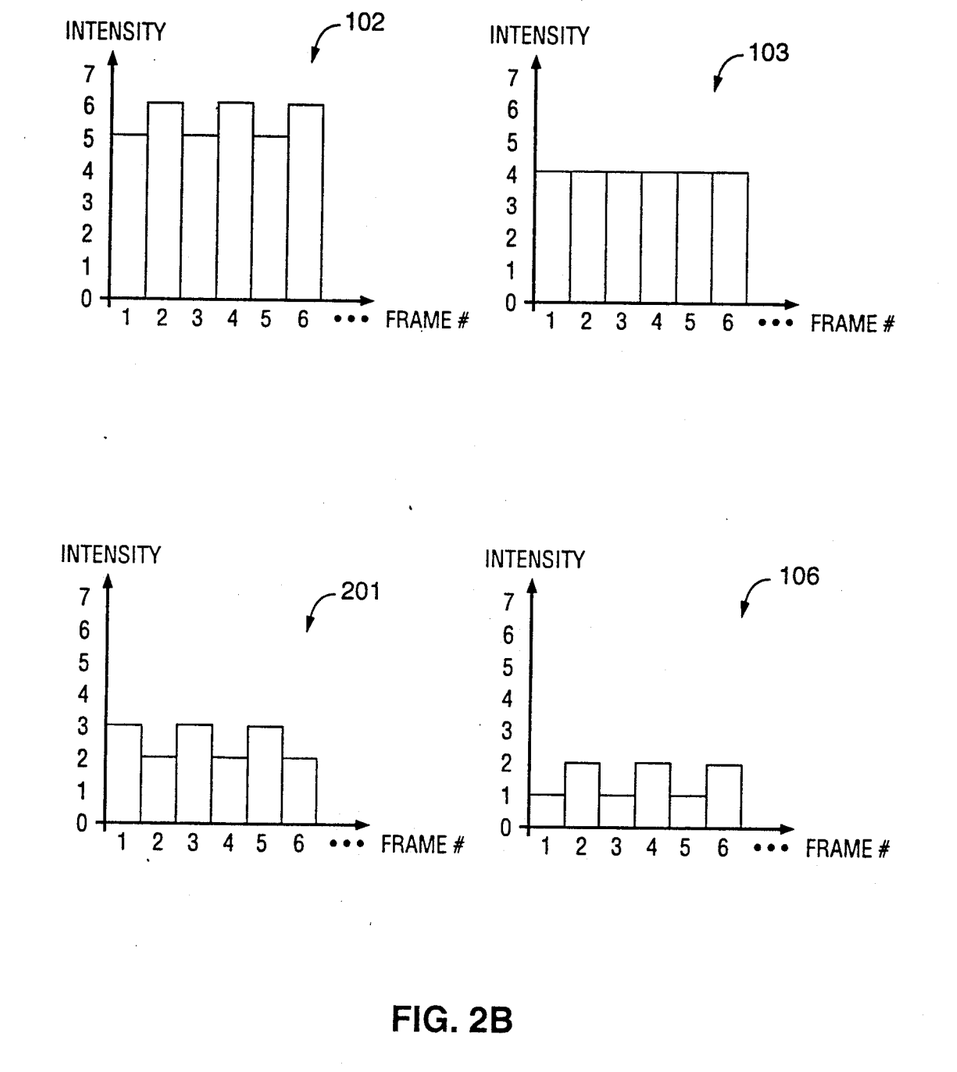

Modulation phase generation and separation circuit 301 thus controls the phasing of the frame rate cycling of the pels being driven so that for neighboring pels, the intensities will not be changed in the same direction in the same frame. This is illustrated in FIGS. 2A and 2B, with respect to pels 102, 201, 103 and 106. Between pels 102 and 201 it can be seen that from frames 1 to 2, pel 102 increases intensity from 5 to 6, while pel 201 decreases intensity from 3 to 2. Assuming that pel 102 is in a 1,1 dot and line position ($x_1$ 3 odd, $y_1$ 3 odd), and therefore pel 201 is in a 1,2 dot and line position (x_odd, y₁₃even), modulation phase generation and separation circuit 301 will increment the driving level to pel 102 only on even frames. See Table A. Likewise, the drive level to pel 201 will be incremented only on odd frames. See Table A. Finally, since pel 106 is at a 2,2 dot and line position (x₁₃even, y₁₃even), modulation phase generation and separation circuit will increment the driving level thereto on even frames.

Figure 4A:
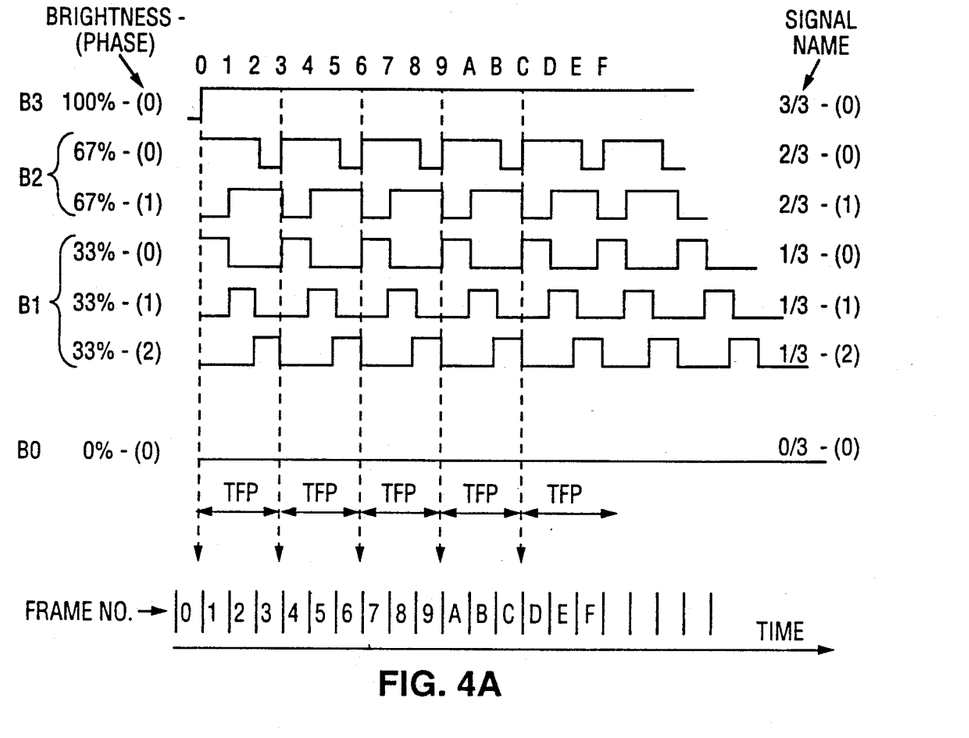
FIGS. 4A, 4B, 4C, and 4D illustrate an embodiment of the present invention in which FRC phases are distributed over the entire display and the distribution of the phases is determined by phase placement patterns such as those discussed in the '622 Application
Figure 4B:
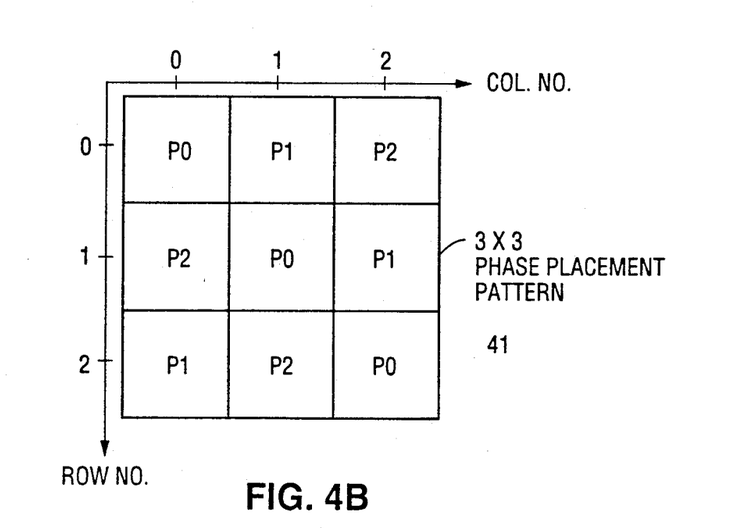

Referring now to FIGS. 4A, 4B, 4C and 4D, a further embodiment of the present invention will be described. FIGS. 4A and 4B are from the '622 Application, referenced earlier, which is hereby incorporated herein by reference in its entirety.

Figure 4C:
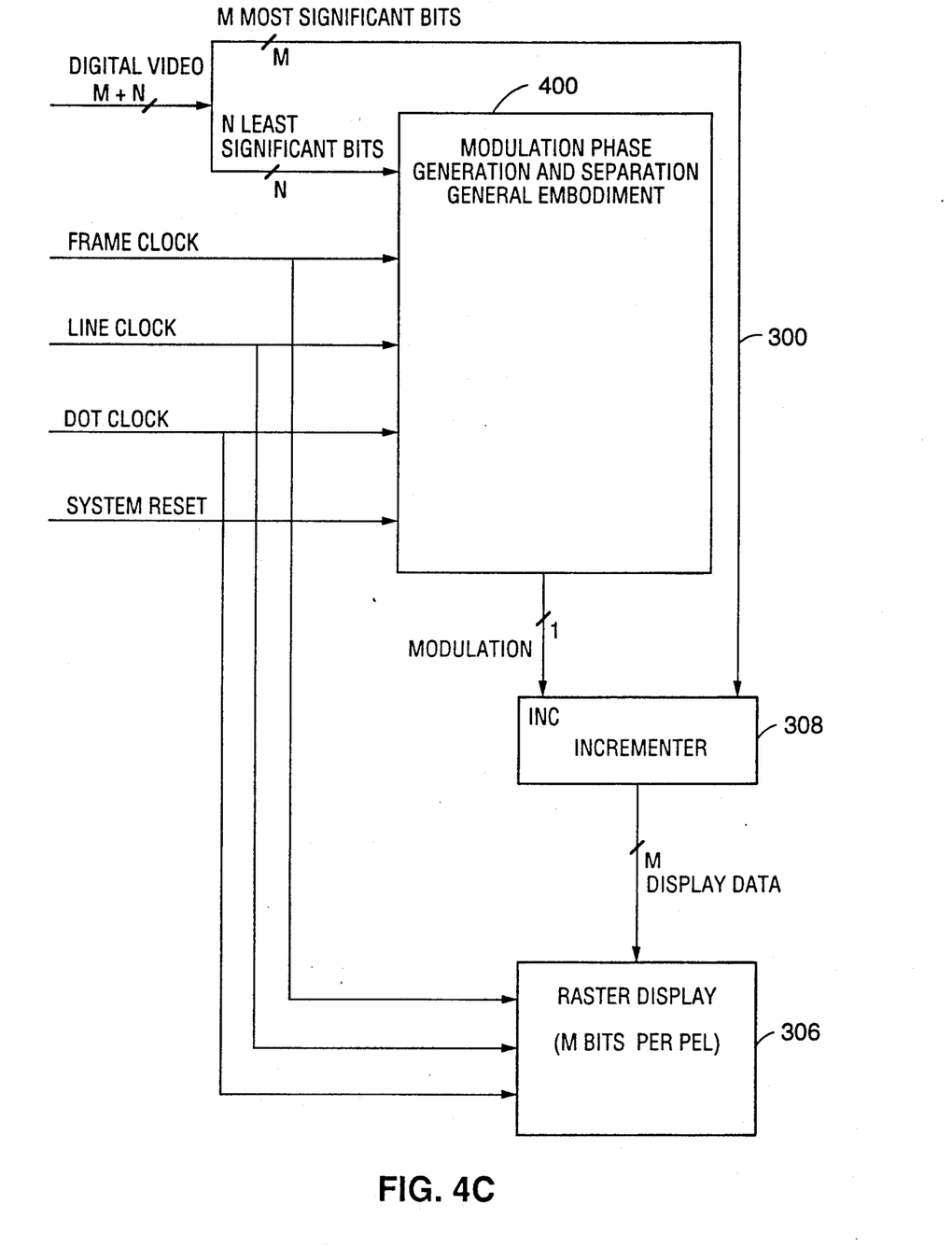

FIGS. 4A and 4B provide one example of a phase-spreading approach that can be used in the modulation phase generation and separation block 400 of FIG. 4C. FIG. 4C is similar in concept to the apparatus of FIG. 3A, however, in place of modulation phase generation and separation circuitry 301, a more generalized block 400 has been substituted. It is to be noted that in addition to the dot clock, line clock, frame clock and system reset, block 400 receives an N-bit signal from the digital video signal. These N-bits are used to indicate different gradations from the native shade specified by the M most significant bits of the digital video signal. Thus, for example, if N is two bits wide, three gradations can be indicated: 0, 1, and 2. In turn, block 400 provides a frame rate cycle waveform having the appropriate duty cycle to produce the indicated gradation over the frame rate cycle period. Furthermore, as a function of the dot, frame, and line clocks, and the system reset, block 400 provides different phases of the selected frame rate cycle waveform in order to minimize the number of neighboring pels which change intensity in the same direction from frame to frame. FIGS. 4A and 4B provide an example of such waveforms and phases.

FIG. 4A illustrates frame rate cycle waveforms for a three-frame frame rate cycle sequence. The designation "TFP" indicates the frame period for each cycle, in this case three frames. The waveforms of FIG. 4A were originally designed to be used in a passive liquid crystal display panel having a single command input bit per pel. Thus, during any one frame, the waveforms provide a single bit which varies between logic one and logic zero states.

The left-hand column of FIG. 4A indicates for each waveform the percentage of frame time during the TFP period the waveform is in a logic one state. Thus, the waveforms labelled "B2" are in a logic one state during 67% of the period. Similarly, the right-hand column indicates a ratio, e.g. "⅔", indicating the number of logic one states in the waveform per TFP period. These quantities relate to the duty cycle of the waveform. When these waveforms are used to vary the intensity of a pel from one native shade to a different native shade, the result is an intermediate shade which is determined by the duty cycle of the waveform.

Also shown in the left-hand and right-hand columns of FIG. 4A are phase designations for each waveform. Thus, for the "B1" waveforms, there is a phase "0" waveform, a phase "1" waveform, and a phase "2" waveform. Although all three phases of the B1 waveforms provide a single logic one state per TFP period, the particular frame in which the logic one state occurs differs from phase to phase.

Similarly, waveforms "B2" are 67% duty cycle frame rate cycling waveforms which have two phases, "0" and "1". It is to be understood that a third possible phase exists but is not shown for the B2 waveforms, namely, a phase with logic one states in the first and last frames of the TFP period, and a logic zero state for the middle frame of the period.

Referring now to FIG. 4B, a phase-placement pattern using the waveforms of FIG. 4A is shown for a 3×3 array of pels. The nomenclature "P0", "P1", and "P2" refer to phase 0, phase 1 and phase 2, respectively, of the waveforms of FIG. 4A. Therefore, for pel 0,0 (row 0, column 0), phase 0 of the waveform is used, while for pel 2,1, phase 1 of the waveform is used. It has been discovered that the phase-placement pattern of FIG. 4B, while being useful in passive liquid crystal display gray scale synthesis, is also useful in minimizing the number of neighboring pels which change intensity states in the same direction from frame to frame.

For example, referring to pels 0,0, 0,1 and 1,0 and the 33% duty cycle waveforms "B1", it can be seen that the phase 0 waveform will result in an increase in intensity for pel 0,0 in frame 1 of the period. Pel 0,1 (phase 1) will be unchanged for that frame, while pel 1,0 (phase 2) will change in the opposite direction. Thus, in-phase changes among neighboring pels is minimized, and out-of-phase changes are increased, by the phase-placement pattern of FIG. 4B.

Figure 4D:
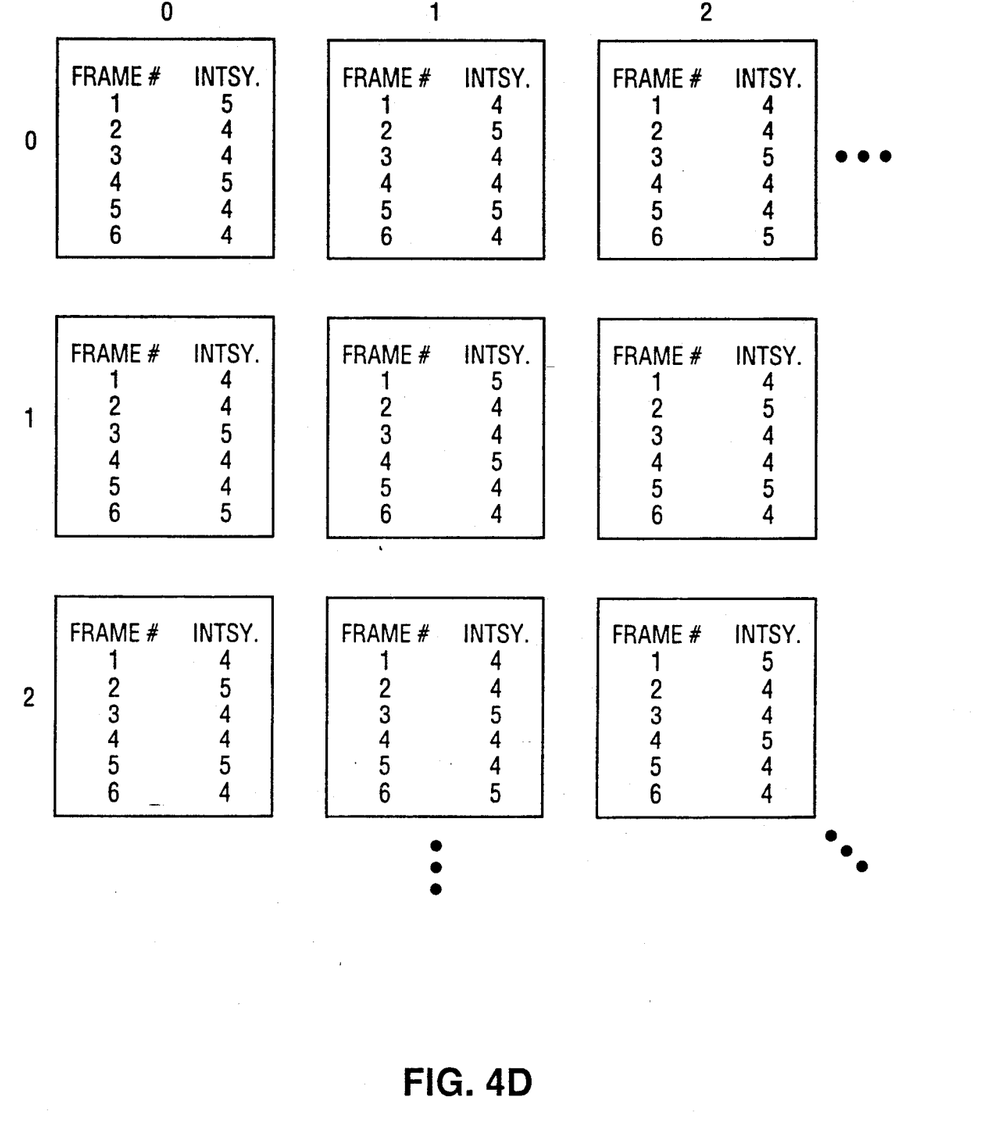

FIG. 4D is a more complete example using the phase-placement pattern of FIG. 4B and the waveforms of FIG. 4A, where the M most significant bits of the digital video signal specify a native shade of 4, and the N least significant bits of the digital video signal specify a 33% duty cycle or gradation. It can be seen, for example, that phase 0 of the B1 waveforms is used for pel 0,0, and that the phase 1 waveform is used for pel 0,1. For pel 0,0, the selected native shade of "4" is used in frames 2, 3, 5 and 6, while the incremented shade of "5" is used in frames 1 and 5. Conversely, for pel 0,1, the selected native shade of "4" is used in frames 1, 3, 4 and 6, while the incremented shade of "5" is used in frames 2 and 5.

For pel 0,0, upward transitions in intensity occur in frames 3 to 4. No change in intensity in pel 0,1 occurs during this time. On the other hand, downward transitions in intensity occur for pel 0,0 during frames 1 to 2 and 4 to 5. During these same frames, upward transitions in intensity occur for pel 0,1. Thus, an inspection of the pels and intensity levels in FIG. 4D reveals that from frame to frame there is a minimum of "in-phase" changes in intensity among neighboring pels, and that transitions tend to be in opposite directions.

In light of the above, it is to be appreciated that for finer gradations of shades, longer frame rate cycling periods (more frames per period) can be used. With these longer periods, additional phases will be available for the waveforms for the various duty cycles to permit the desired phase-spreading to reduce in-phase transitions between neighboring pixels and to thus reduce flicker.

It is to be understood that in accordance with the present invention block 400 of FIG. 4C can utilize other techniques which are suitable for producing gray shading in passive liquid crystal display panels. Where P gradations are desired, and $2^M$ native shades are available, such other techniques should be capable of cycling modulation waveforms over P frames, and should provide phases of the modulation waveforms which permit the phase relationship of the applied modulating waveforms to be distributed to reduce in-phase flicker reinforcement by modulating waveforms applied to neighboring pels. The technique should separate, by phase shifting, the phases of the modulation waveforms applied to the frame rate cycling pels, creating multiple phases of the waveforms; spread across the X axis the different-phase modulation waveforms of pels undergoing frame rate cycling, in such a way as to minimize the in-phase relationship of neighboring pels; spread across the Y-axis the different-phase modulation waveforms of pels undergoing frame rate cycling, in such a way as to minimize the in-phase relationship of neighboring pels; and spread modulation phases over an X or Y range that is a subset of the display X or Y size in order to minimize flicker for each subset region.

The terms and expressions which have been employed herein are used as terms of description and not of limitation, and there is no intention in the use of such terms and expressions of excluding equivalents of the features shown and described, or portions thereof, it being recognized that various modifications are possible within the scope of the invention claimed.

We claim:

1. In a display system having a multishade display panel in which a plurality of pels are arranged as dots within a plurality of lines, so that each pel is identifiable by a line number and a dot number, wherein the shade of each pel is selectable from N different native shade levels, where N is greater than two, and the shade of each pel can be selected on a frame by frame basis in a sequence of frames, an apparatus for increasing the number of selectable shade levels comprising means for specifying from the N different native shades a first native shade to which a pel is to be driven; and means coupled to the specifying means and responsive to the dot and line number of the pel being driven and to the frame number in the sequence of frames for selecting a second shade different from the first shade so that the pel is driven to the second shade over selected frames in the sequence of frames, and so that, with respect to neighboring pels which are being driven with more than one shade during the sequence of frames, the change between the native shades in any one pel is out of phase with the change between native shades in neighboring pels.

2. In a display system having a multishade panel in which a plurality of pels are arranged as dots within a plurality of lines, so that each pel is identifiable by a line number and a dot number, wherein the shade of each pel is selectable from N different native shade levels, where N is greater than two, and the shade of each pel can be selected on a frame by frame basis in a sequence of frames, an apparatus for increasing the number of selectable shade levels comprising means for specifying a first native shade for driving a pel in one frame and a second native shade, different from the first native shade, for driving the pel in a different frame in the sequence of frames to provide an apparent shade for the pel which is an average of the number of times the selected first and second native shades are driven in the sequence of frames; and means coupled to the selecting means and responsive to the dot and line number of the pel being driven and to the frame number in the sequence of frames for controlling the specifying means so that the change from frame to frame between the native shades in any one pel is out of phase with the change between native shades in neighboring pels.

3. In a display system having a plurality of pels arranged as dots within a plurality of lines, so that each pel is identifiable by a line number and a dot number, wherein the shade of each pel is selectable from N different native shade levels, where N is greater than two, and the shade of each pel can be selected on a frame by frame basis in a sequence of frames, an apparatus for increasing the number selectable shade levels comprising means for selecting a native shade to which a pel is to be driven wherein the selected native shade is alternated between a first native shade in one frame and a higher second native shade in a next frame in the sequence of frames to provide an apparent shade for the pel which is an average of the selected first and second native shades; and means coupled to the selecting means and responsive to the dot and line number of the pel being driven and to the frame number in the sequence of frames for controlling the selecting means from frame to frame with respect to neighboring pels which are being driven between more than one native shades so as to minimize the number of times that a change from the first native shade in one frame to the higher native shade in the next frame for any one pel occurs when the change in neighboring pels is also from a lower native shade to a higher native shade.

4. In a multishade display system having a plurality of pels arranged as dots within a plurality of lines, so that each pel is identifiable by a line number and a dot number, wherein each pel produces one of N different native shades when it is driven with an associated one of N different drive levels during each frame in a sequence of consecutive frames, where N is greater than two, an apparatus for increasing the number of shades comprising means for driving a subject pel during the sequence of consecutive frames in a selected phase-pattern and frame rate duty cycle to produce a first native shade in one or more of the frames and to produce a second native shade, different from the first native shade, in the other frames, so that the subject pel has an apparent shade over the sequence of consecutive frames which is intermediate the first and second native shades, wherein the apparent shade is determined by the selected frame rate duty cycle which specifies the number of frames in the sequence of consecutive frames in which the subject pel is driven to produce the first native shade and the number of frames in which the subject pels is driven to produce the second native shade, and further wherein the selection of the particular frames in which the first native shade is produced and of the frames in which the second native shade is produced is determined by the selected phase-pattern; and means responsive to the dot number, the line number and the frame for the subject pel for selecting a phase-pattern for driving the subject pel and selecting phase-patterns for driving neighboring pel so as to minimize from frame to frame the number of neighboring pels in which the transition between native shades is in the same direction as the direction of the transition between native shades in the subject pel.

5. In a display system of the type which includes a multishade display panel in which a plurality of pels are arranged as dots within a plurality of lines, so that each pel is identifiable by a line number and a dot number, and in which each pel can be driven with one of N discrete drive levels to provide one of N native shade levels, an apparatus for increasing the number of shades comprising     means responsive to the dot and line numbers of a subject pel for generating frame rate cycling waveforms and which are associated with pels of the multishade display panel according to phase-placement patterns, wherein the frame rate cycling waveforms and the phase-placement patterns are of the type which can be used with passive liquid crystal display panels to obtain multiple gray scale intensities in a manner which minimizes in-phase relationships of neighboring pels; and     means responsive to the frame rate cycling waveforms from the generating means and to a selected native shade for modulating the selected native shade to provide a display data waveform which varies from the selected native shade in accordance with the frame rate cycling waveform, and providing a shade which is intermediate the selected native shade and a next native shade.

6. In a display system having a multishade display panel in which a plurality of pels are arranged as dots within a plurality of lines, so that each pel is identifiable by a lie number and a dot number, wherein each pel produces one of N different native shades when it is driven with an associated one of N different drive levels during each frame in a sequence of consecutive frames, an apparatus for increasing the number of shades comprising     incrementer means responsive to a specified native shade and to a modulation control signal for supplying a pel driving signal to drive a subject pel in the multishade display panel, wherein the pel driving signal is formed from the specified native shade as modulated by the modulation control signal, so that the pel driving signal to be either the specified native shade or the specified native shade which has been incremented by a specified amount;

modulation phase generation and separation means responsive to the dot number, the line number, the frame in the consecutive sequence of frames, and to a gradation command, for providing the modulation control signal to the incrementing means, the modulation phase generation and separation means including:

first means which are toggled by the dot number and reset by the line number of the subject pel for providing an indication of when the subject pel is at an "even" dot position;

second means which are toggled by the line number of the subject pel and reset by the frame number in the consecutive sequence of frames for providing an indication of when the subject pel is at an "even" line position;

third means which are toggled by the frame number for providing an indication of when the frame is at an "even" frame position;

exclusive-OR logic means for providing an output which is the logical exclusive-OR of the "even" dot position indication, the "even" line position indication, and the "even" frame position indication from the first, second and third means; and     AND logic means for providing an output which is the logical AND of the gradation command and the output from the exclusive-OR logic means and for supplying the output to the incrementer means as the modulation control signal;

so that from frame the number of neighboring pels in which the transition between native shades is in the same direction as the direction of the transition between native shades in the subject pel is minimized.

7. In a display system having a multishade display panel in which a plurality of pels are arranged as dots within a plurality of lines, so that each pel is identifiable by a line number and a dot number, wherein each pel produces one of N different native shades when it is driven with an associated one of N different drive levels during each frame in a sequence of consecutive frames, an apparatus for increasing the number of shades comprising     decrementer means responsive to a specified native shade and to a modulation control signal for supplying a pel driving signal to drive a subject pel in the display panel, wherein the pel driving signal is formed from the specified native shade as modulated by the modulation control signal, so that the pel driving signal is controlled by the modulation control signal to be either the specified native shade or the specified native shade which has been decremented by a specified amount;

modulation phase generation and separation means responsive to the dot number, the line number, the frame in the consecutive sequence of frames, and to a gradation command, for providing the modulation control signal to the decrementing means, the modulation phase generation and separation means including:

first means which are toggled by the dot number and reset by the line number of the subject pel for providing an indication of when the subject pel is at an "even" dot position;

second means which are toggled by the line number of the subject pel and reset by the frame number in the consecutive sequence of frames for providing an indication of when the subject pel is at an "even" line position;

third means which are toggled by the frame number for providing an indication of when the frame is at an "even" frame position;

exclusive-OR logic means for providing an output which is the logical exclusive-OR of the "even" dot position indication, the "even" line position indication, and the "even" frame position indication from the first, second and third means, and     NAND logic means for providing an output which is the logical NAND of the gradation command and the output from the exclusive-OR logic means and for supplying the output to the decrementer means as the modulation control signal;

so that from frame to frame the number of neighboring pels in which the transition between native hades is in the same direction as the direction of the transition between native shades in the subject pel is minimized.

* * * * *